(12) United States Patent
Howe et al.

(10) Patent No.: US 8,888,169 B2
(45) Date of Patent: Nov. 18, 2014

(54) MOTOR VEHICLE STRUCTURE, AND METHOD OF MAKING A MOTOR VEHICLE STRUCTURE

(75) Inventors: Christian Howe, Paderborn (DE); Johannes Böke, Blomberg (DE); Marco Maciej, Paderborn (DE)

(73) Assignee: Benteler SGL GmbH & Co. KG, Paderborn (DE)

( * ) Notice: Subject to any disclaimer, the term of this patent is extended or adjusted under 35 U.S.C. 154(b) by 0 days.

(21) Appl. No.: 13/361,636

(22) Filed: Jan. 30, 2012

(65) Prior Publication Data
US 2012/0193939 A1 Aug. 2, 2012

(30) Foreign Application Priority Data
Jan. 31, 2011 (DE) .......................... 10 2011 009 892

(51) Int. Cl.
| | | |
|---|---|---|
| *B62D 25/04* | (2006.01) | |
| *B32B 15/18* | (2006.01) | |
| *B32B 15/14* | (2006.01) | |
| *B32B 5/02* | (2006.01) | |
| *B32B 5/12* | (2006.01) | |
| *B32B 5/26* | (2006.01) | |
| *B62D 29/00* | (2006.01) | |
| *B32B 7/06* | (2006.01) | |
| *B32B 3/26* | (2006.01) | |

(52) U.S. Cl.
CPC .............. *B62D 29/005* (2013.01); *B32B 15/18* (2013.01); *B32B 2260/046* (2013.01); *B62D 25/04* (2013.01); *B32B 2262/10* (2013.01); *B32B 15/14* (2013.01); *B32B 5/022* (2013.01); *B32B 2262/106* (2013.01); *B32B 2262/103* (2013.01); *B32B 5/12* (2013.01); *B32B 2605/00* (2013.01); *B32B 5/26* (2013.01); *B32B 2260/023* (2013.01); *B32B 2262/101* (2013.01); *B32B 7/06* (2013.01); *B32B 3/26* (2013.01)
USPC ................................ 296/187.12; 296/187.01

(58) Field of Classification Search
CPC ...................................................... B62D 21/157
USPC ........................................ 296/187.12, 187.01
See application file for complete search history.

(56) References Cited

U.S. PATENT DOCUMENTS

| | | | |
|---|---|---|---|
| 5,368,921 A | 11/1994 | Ishii et al. | |
| 5,914,163 A * | 6/1999 | Browne | ....................... 428/36.1 |
| 6,938,840 B1 | 9/2005 | Truschel et al. | |
| 7,200,912 B2 * | 4/2007 | Bouillon et al. | ................. 29/432 |
| 8,070,904 B2 * | 12/2011 | Howe et al. | .................... 156/245 |
| 2008/0156425 A1 | 7/2008 | Howe et al. | |

(Continued)

FOREIGN PATENT DOCUMENTS

| | | |
|---|---|---|
| DE | 1 959 277 A | 5/1971 |
| DE | 21 11 748 A | 11/1971 |
| DE | 691 22 919 T2 | 3/1997 |

(Continued)

*Primary Examiner* — Glenn Dayoan
*Assistant Examiner* — Melissa A Black
(74) *Attorney, Agent, or Firm* — Henry M. Feiereisen LLC

(57) ABSTRACT

A motor vehicle structure includes a metallic base body in the form of a three-dimensional metal sheet and a reinforcement element made of fiber composite having a matrix resin for coupling the reinforcement element with the base body in a coupling zone by a material joint. Arranged between the base body and the reinforcement element is a non-woven having voids through which the matrix resin is able to permeate.

19 Claims, 2 Drawing Sheets

(56) References Cited

U.S. PATENT DOCUMENTS

2010/0051183 A1   3/2010  Howe et al.
2010/0300584 A1  12/2010  Buschsieweke et al.
2012/0153669 A1*  6/2012  Nagwanshi et al. ..... 296/187.08

FOREIGN PATENT DOCUMENTS

| GB | 1341500 | 12/1973 |
| JP | 62-030177 | 2/1987 |
| WO | WO 00/12892 A | 3/2000 |

* cited by examiner

MOTOR VEHICLE STRUCTURE, AND METHOD OF MAKING A MOTOR VEHICLE STRUCTURE

CROSS-REFERENCES TO RELATED APPLICATIONS

This application claims the priority of German Patent Application, Serial No. 10 2011 009 892.5, filed Jan. 31, 2011, pursuant to 35 U.S.C. 119(a)-(d), the content of which is incorporated herein by reference in its entirety as if fully set forth herein.

BACKGROUND OF THE INVENTION

The present invention relates to a motor vehicle structure, and to a method of making a motor vehicle structure.

The following discussion of related art is provided to assist the reader in understanding the advantages of the invention, and is not to be construed as an admission that this related art is prior art to this invention.

It is known to produce body and/or chassis parts in hybrid construction, whereby sections of a metallic base body are reinforced with a fiber-reinforced composite to realize lightweight structures with enhanced crash behavior. Mechanical and bonding processes as well as direct formfitting injection molding have hereby been proposed. Manufacture of hybrid structures is fairly complex because the individual components must be produced and then connected to one another. In particular when using fiber composites, curing times and bonding times have to be taken into account and adversely affect the cycle time of the production process.

Moreover, cumbersome cleaning and/or preparation processes are necessary for coupling metallic components with fiber composites.

German Patent Document DE 1 959 277 A1 discloses a method of coupling fabrics with glass fibers with a carrier material of steel. A matting or non-woven of steel fibers is coupled by a material joint with the steel carrier, using a welding or soldering process, i.e. a thermal joining process. Placed on the matting or non-woven of steel fibers is a matting or a fabric of glass fibers and impregnated with resin. Resin permeates formfittingly into the matting or non-woven of steel fibers and connects the matting or the non-woven of steel fibers with the matting or the fabric of glass fibers, thereby establishing an indirect coupling between the metallic carrier and the fiber composite.

A drawback of conventional coupling processes for manufacturing hybrid structures resides in the absence of maintaining an even joining gap when for example bonding or foaming the components to be connected. In addition, structural tolerances between the components adversely affect the connection as the attachments are inadequate and gaps can form between the components. This can lead to corrosion when used in the manufacture of a vehicle body part and thus adversely affect crash performance when a force level is exceeded.

It would therefore be desirable and advantageous to address these problems and to obviate other prior art shortcomings.

SUMMARY OF THE INVENTION

According to one aspect of the present invention, a motor vehicle structure includes a metallic base body in the form of a three-dimensional metal sheet, a reinforcement element made of fiber composite having a matrix resin for coupling the reinforcement element with the base body in a coupling zone by a material joint, and a non-woven arranged between the base body and the reinforcement element.

The base body which may be formed three-dimensionally and made of a metallic material such as steel alloy or light metal alloy can thus be coupled with a fiber composite which may be made of carbon fibers, glass fibers, or also, e.g. basalt fibers, and a matrix resin applied thereon. The non-woven placed between the base body and the fiber composite ensures a substantially gap-free connection and a material joint across the entire surface in the coupling zones in combination with the matrix resin between the fiber composite and the base body.

According to another advantageous feature of the present invention, the matrix resin can extend or permeate or penetrate through the non-woven. The non-woven may involve a fiber material or a material made from natural material or plastic material. The non-woven is permeable or semi-permeable and can be provided with voids, e.g. in the form of pores. This ensures that the matrix resin to cure the fiber composite permeates through the non-woven to establish a connection with the base body across the entire surface. The base body and the fiber composite thus constitute different materials which are joined with one another as an intermediate layer cures.

The matrix resin may be formed by the matrix resin that is used during the curing process of the fiber composite or may represent a particular extra layer of the matrix resin which has been applied beforehand to subsequently establish as intermediate layer the material joint between the base body and the fiber composite.

Overall, the present invention provides a structural union which is predominantly elastically deformed in the event of a crash without adversely affecting the bond and without breaking or splintering the reinforcement element. As a result, the crash performance is maintained and the components can be dimensioned to lower their overall weight as they undergo predominantly an elastic deformation.

According to another advantageous feature of the present invention, the fiber composite has fibers which can be arranged at a ratio of substantially 4:1 in a longitudinal direction in relation to a transverse direction of the base body. Thus, fiber material is used which can find application in a weave as matting. There are fibers oriented in longitudinal direction and fibers oriented in transverse direction. Tests have shown that it is advantageous to orient four fibers in longitudinal direction of the base body for each fiber oriented transversely to the longitudinal direction. In other words, 80% of fibers are oriented in longitudinal direction and 20% of fibers are oriented at an angle at substantially 90 degrees in relation to the longitudinal direction of the base body. This ratio has shown to enhance crash behavior and accompanying plasticity demands and elasticity requirements.

According to another advantageous feature of the present invention, the fiber composite may have different wall thicknesses. Varying wall thicknesses enable the motor vehicle structure to be best suited to the crash situation at hand in the crash-relevant regions. It is thus for example possible to arrange a fiber composite with greater wall thickness in regions that should undergo less crumpling than in regions which should meet higher plasticity requirements.

According to another advantageous feature of the present invention, the fiber composite may be a prepreg. Prepreg within the scope of the invention relates to a fiber material which already contains matrix resin that can cure under different conditions. These conditions may involve for example:

feeding chemical substances, e.g. oxygen or the like;
curing at ambient air;
adding heat, or
curing through ultrasound waves or the like.

The fiber composite may also be laminated, i.e. the fiber material is applied and then covered or permeated by various matrix resin layers.

According to another advantageous feature of the present invention, the motor vehicle structure may be constructed to form an A-pillar or a B-pillar of a motor vehicle. Other examples vehicle parts that can be constructed from a motor vehicle structure according to the present invention involve side rails, bumpers, tie rods or roof sections. All these parts have to meet particular crash requirements, especially when a self-supporting body is involved. The use of fiber composite is beneficial because it contributes in particular to a reinforcement of crash-relevant zones of the vehicle body. The gap-free coupling through a material joint and the arrangement of the non-woven prevent the occurrence of a fiber breakage in the event of a crash. Thus, the presence of the fiber composite in combination with the coupling according to the invention results in particular in an increase of the bending stiffness, and the hybrid structure in turn causes an increase in strength.

According to another aspect of the present invention, a method of making a motor vehicle structure includes producing a stack having at least one layer of a fiber material and a layer of at least one other material, applying a matrix resin film upon the stack, placing a non-woven upon the matrix resin film, molding the stack onto a three-dimensional base body at a region intended for reinforcement, and allowing the region to cure to produce a motor vehicle structure.

The stack may include at least one layer of fiber material, such as fiber fabric, or include a plurality of several layers of fiber material.

In accordance with the present invention, a three-dimensional base body, e.g. a sheet of metal, is provided, and a stack is prepared upon which a matrix resin film is applied. The stack may be made of a prepreg material. The matrix resin film is applied upon the stack at a side which is to be joined with the base body. A non-woven is placed upon the matrix resin film to prevent contamination of the matrix resin film and to prevent a dripping of the matrix resin. At this point, the stack while still being substantially in flat configuration, for example in the form of a layer, is molded onto the base body at regions which are intended for reinforcement. Molding causes a flow or diffusion of the matrix resin film through the non-woven, and the matrix resin film then connects with the base body.

According to another advantageous feature of the present invention, the stack can be made by stacking an adhesive film, a prepreg material, and a protective film, with the protective film being attached on a side distal to the three-dimensional metallic base body. The provision of the protective film prevents tools or other objects in the production process to contact the fiber composite reinforcement. The protective film may be removed during or after curing has taken place or may be left on the structure. The adhesive film may be made from adhesive resin having properties of any crash-resistant adhesive normally used in body construction, and a carrier material of the adhesive or adhesive film which carrier material is permeated by the adhesive resin when subjected to pressure and/or temperature and connects with the surface to be coupled. The thickness of the carrier material may hereby be used to adjust the thickness of the adhesive layer.

The fiber composite may contain carbon fibers, glass fibers, or also, e.g. basalt fibers. Also metallic fibers may be used and the matrix resin may be an epoxy matrix resin.

The fiber composite can be made from any combination of the afore-described fiber options. The use of a prepreg fabric, DU-prepreg and/or unidirectional prepreg (biaxial or multi-axial) allows selection of prepreg material to best suit the application at hand and requirements with respect to crash properties. The stack and/or the fiber composite can be prepared in a calendering unit through stacking the individual layers. This can be realized for example by stacking upon a protective layer various prepreg layers and then the adhesive film and a non-woven material. The selection of prepregs of different widths or the use of prepreg rolls has the benefit that the stack can be produced with different wall thicknesses. These wall thicknesses may then be arranged and selected and produced to optimize weight and load considerations.

After the stack is coupled to the base body and the thus-produced hybrid structure cures as the stack impregnated with matrix resin and the matrix resin connection between stack and base body cures. It is possible within the scope of the invention to use laminated stack as well as prepreg material. In the latter case, the matrix resin film may be applied on the stack at the side intended for connection with the base body or may be activated by a tear-off fabric for example on the side to be connected.

According to another advantageous feature of the present invention, the stack may be compressed with the base body during or after the molding step. Application of the compression force may be realized by using a mechanical press or a pneumatic press or a hydraulic press. The compression may be applied across the entire surface at the same time or also incrementally by using a roller or a robotic arm for example. The application of the compression force ensures a joint across the entire surface substantially without any trapped oxygen.

According to another advantageous feature of the present invention, the stack may be preformed before the molding step. This is beneficial because a smudging of the matrix resin before or during molding can be prevented for example.

According to another advantageous feature of the present invention, the motor vehicle structure may be subjected to a local heat treatment during or after the production process. Local heat treatment results in the realization of particular properties of the matrix resin and curing of the matrix resin. For example, it may be suitable to provide better flow characteristics of the matrix resin in certain regions of the base body through pre-heating. Moreover, local heat treatment during or after the production method allows realization of different hardness degrees of the joint being produced. Especially when considering the realized properties of the reinforcement of the motor vehicle structure in accordance with the production method of the present invention, there are many benefits, also when taking into account the absence of any fiber breakage.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figures 1, 2:
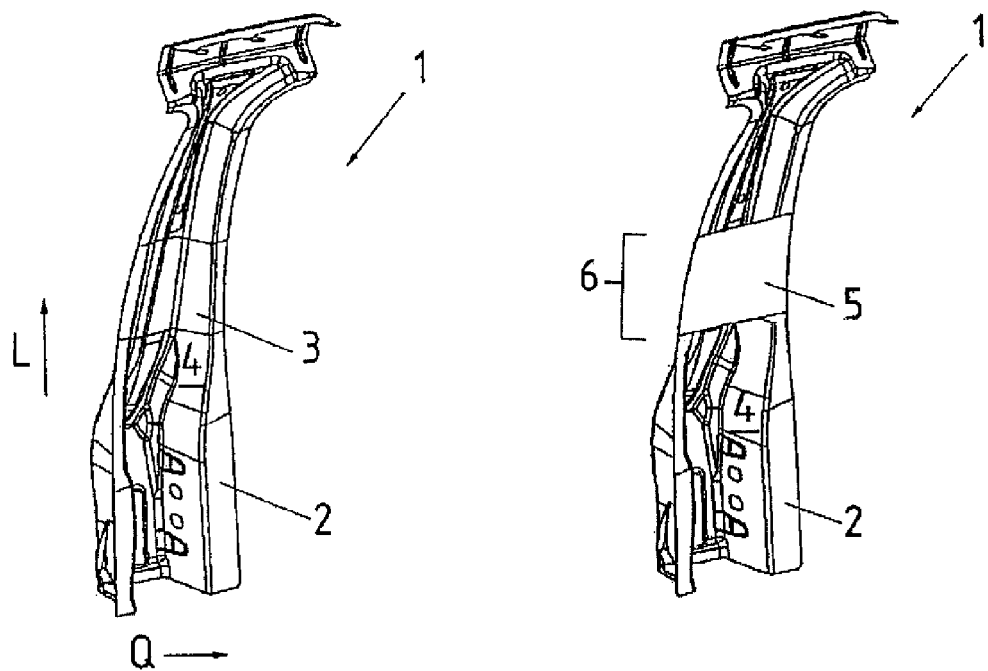
FIG. 1 is a perspective illustration of one configuration of a motor vehicle structure according to the present invention.
FIG. 2 is a perspective illustration of the motor vehicle structure during its production.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective illustration of one configuration of a motor vehicle structure according to the present invention, generally designated by reference numeral 1 and configured in the form of B-pillar. The motor vehicle structure 1 includes a metallic base body 2 and a reinforcement element 3 applied upon the base body 2. The reinforcement element 3 is applied on an inner side 4 of the base body 2 to reinforce this region. The motor vehicle structure 1 defines a longitudinal direction L and a transverse direction Q.

FIG. 2 shows the motor vehicle structure 1 during production thereof. A stack 5 is hereby arranged in a region 6 to be reinforced. The stack 5 is then molded onto the region 6 as indicated in FIG. 2 and also shown in FIG. 1. When the stack 5 has cured with the matrix resin (not shown), the reinforcement element 3 is formed and is connected with the base body 2 by a material joint.

Figure 3:
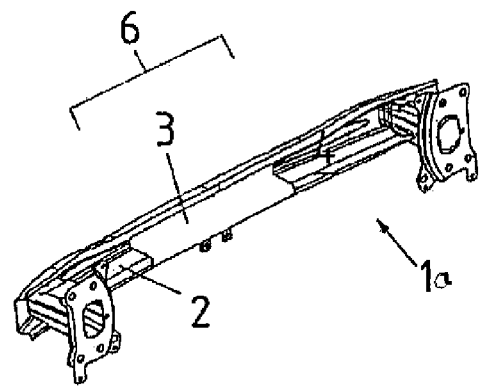
FIG. 3 is a perspective illustration of another configuration of a motor vehicle structure according to the present invention.

FIG. 3 is a perspective illustration of another configuration of a motor vehicle structure according to the present invention, generally designated by reference numeral 1a. Parts corresponding with those in FIG. 1 are denoted by identical reference numerals and not explained again. In this embodiment, the motor vehicle structure 1a represents a crossbeam having a region 6 which is reinforced with a reinforcement element 3 across an entire surface on an inner side 4.

Figure 4:
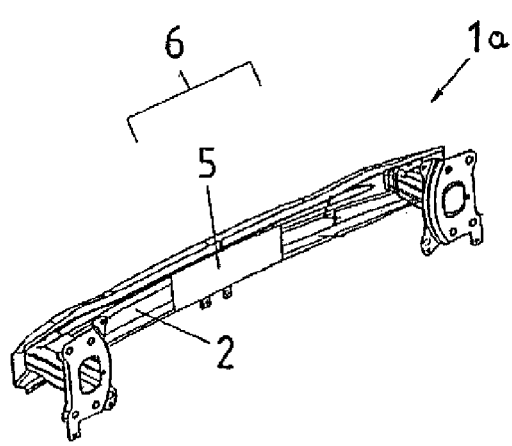
FIG. 4 is a perspective illustration of the motor vehicle structure of FIG. 3 during its production.

FIG. 4 shows the motor vehicle structure 1a during production thereof. The stack 5 is again is molded onto a region 6. After the not shown matrix resin has cured, the motor vehicle structure 1a is realized, comprised of base body 2 and reinforcement element 3.

Figure 5:
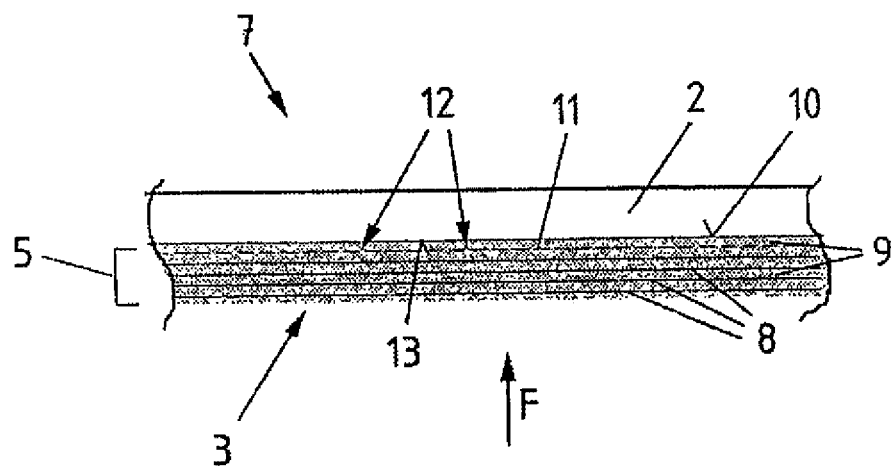
FIG. 5 is a schematic sectional view of a coupling zone made in accordance with the method of the present invention.

Referring now to FIG. 5, there is shown a schematic sectional view of a coupling zone 7 made in accordance with the method of the present invention. The base body 2 is coupled to the reinforcement element 3 across the entire surface. The reinforcement element 3 is comprised of several layers 8 of fiber material which are stacked upon one another. Matrix resin 9 is located between the fiber material layers 8 to produce a fiber composite after the matrix resin has cured. Placed between the base body 2 and a base-body-proximal side 10 of the reinforcement element 3 is a non-woven 11 having voids 12 through which the matrix resin 9 is able to permeate. Matrix resin 9 migrating through the voids 12 provides a material joint with the surface 13 if the base body 2. Application of a force F results in a greater amount of matrix resin 9 to permeate the non-woven 11 and to enhance the strength of the material joint between the reinforcement element 3 and the base body 2.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A motor vehicle structure, comprising:
   a metallic base body in the form of a three-dimensional metal sheet;
   a reinforcement element made of fiber composite having a matrix resin for coupling the reinforcement element with the base body in a coupling zone by a material joint; and
   a single layer of a non-woven arranged between the base body and the reinforcement element.

2. The motor vehicle structure of claim 1, wherein the base body is made of steel alloy or light metal alloy.

3. The motor vehicle structure of claim 1, wherein the fiber composite includes carbon fibers, glass fibers, basalt fibers or metal fibers.

4. The motor vehicle structure of claim 1, wherein the matrix resin permeates through voids in the non-woven.

5. The motor vehicle structure of claim 1, wherein the fiber composite has fibers arranged at a ratio of substantially 4:1 in a longitudinal direction in relation to a transverse direction of the base body.

6. The motor vehicle structure of claim 1, wherein the fiber composite is a prepreg.

7. The motor vehicle structure of claim 1, wherein the fiber composite has areas of different wall thickness.

8. The motor vehicle structure of claim 1, constructed to form a B-pillar of a motor vehicle.

9. The motor vehicle structure of claim 1, constructed to form an A-pillar of a motor vehicle.

10. A method of making a motor vehicle structure, comprising:
    producing a stack having at least one layer of a fiber material and a layer of at least one other material;
    applying a matrix resin film upon the stack;
    placing a single layer of a non-woven upon the matrix resin film;
    molding the stack onto a three-dimensional base body at a region intended for reinforcement; and
    allowing the region to cure to produce a motor vehicle structure.

11. The method of claim 10, wherein the fiber material is a prepreg.

12. The method of claim 10, wherein the stack is formed by the fiber material in combination with an adhesive film and a protective film, with the protective film attached on a side of the fiber material distal to the three-dimensional base body.

13. The method of claim 12, wherein the protective film is removed during or after curing.

14. The method of claim 12, wherein the adhesive film is comprised of an adhesive resin and a carrier material permeated by the adhesive resin.

15. The method of claim 10, wherein the matrix resin is an epoxy matrix resin.

16. The method of claim 10, further comprising compressing the stack with the base body during or after the molding step.

17. The method of claim 10, further comprising preforming the stack before the molding step.

18. The method of claim 10, further comprising subjecting the motor vehicle structure to a local heat treatment during and/or after production thereof.

19. The method of claim 10, wherein the stack is produced by placing the layer of fiber material and the layer of at least one other material upon a protective film.

\* \* \* \* \*